(12) United States Patent
Moyer

(10) Patent No.: US 7,096,307 B2
(45) Date of Patent: Aug. 22, 2006

(54) SHARED WRITE BUFFER IN A PERIPHERAL INTERFACE AND METHOD OF OPERATING

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 768 days.

(21) Appl. No.: 10/323,313

(22) Filed: Dec. 18, 2002

(65) Prior Publication Data

US 2004/0123010 A1 Jun. 24, 2004

(51) Int. Cl.
*G06F 13/20* (2006.01)

(52) U.S. Cl. ............... 710/313; 710/107; 710/112; 710/39

(58) Field of Classification Search ............. 710/305, 710/112, 240–244, 310, 311, 313, 107, 39, 710/309, 260; 711/147
See application file for complete search history.

(56) References Cited

U.S. PATENT DOCUMENTS

| | | | |
|---|---|---|---|
| 5,682,551 A * | 10/1997 | Pawlowski et al. ........... 710/36 |
| 5,712,991 A | 1/1998 | Wichman et al. | |
| 5,758,166 A * | 5/1998 | Ajanovic .................. 710/240 |
| 5,983,306 A * | 11/1999 | Corrigan et al. ............ 710/310 |
| 6,145,044 A * | 11/2000 | Ogura ...................... 710/311 |
| 6,256,699 B1 | 7/2001 | Lee | |
| 6,324,612 B1 * | 11/2001 | Chen et al. ................. 710/306 |
| 6,823,412 B1 * | 11/2004 | Regis ....................... 710/121 |
| 2001/0052054 A1 * | 12/2001 | Franke et al. .............. 711/147 |
| 2002/0052995 A1 | 5/2002 | Jahnke et al. | |
| 2002/0052999 A1 | 5/2002 | Jahnke et al. | |
| 2003/0053468 A1 * | 3/2003 | Deng et al. ................. 370/402 |

OTHER PUBLICATIONS

Brent, G. et al.; "Asynchronous Multi-Clock Bidirectional Buffer Controller"; IBM Technical Disclosure Bulletin; Jan., 1982; pp 4404-4406; vol. 24, No. 8; IBM.
"PCI Local Bus Specification"; Jun. 1, 1995; pp li-xvi, 2-282; PCI Special Interest Group, Portland, OR.

* cited by examiner

*Primary Examiner*—Rehana Perveen
*Assistant Examiner*—Kim T. Huynh
(74) *Attorney, Agent, or Firm*—Robert L. King; David G. Dolezal

(57) ABSTRACT

A data processing system has a single configurable write buffer within a peripheral interface unit that is shared among multiple peripherals. Configuration registers are dynamically programmed to control criteria for determining whether control of a system bus will be released prior to completion of a write access to a peripheral. The criteria include which peripheral is being accessed, the particular bus master that is requesting the write request, and a mode of operation, such as supervisor or user write access modes. Write buffering may also be dynamically disabled for individual peripherals based on the state of a peripheral by using a hardware side band signal driven by the peripheral to override a static buffer write policy programmed in control registers.

21 Claims, 2 Drawing Sheets

SHARED WRITE BUFFER IN A PERIPHERAL INTERFACE AND METHOD OF OPERATING

CROSS REFERENCE TO RELATED APPLICATION

This application is related to my copending U.S. patent application Ser. No. 10/094,082 entitled "Data Processing System With Peripheral Access Protection And Method Therefor" filed Mar. 8, 2002 and assigned to the assignee hereof.

FIELD OF THE INVENTION

This invention relates generally to semiconductor circuits, and more specifically, to peripheral interfaces of data processing systems.

BACKGROUND OF THE INVENTION

In data processing systems, peripheral interface units are used to connect low-speed peripheral devices to a higher speed system bus used by central processing units (CPUs), direct memory access (DMA) devices and other types of bus masters. The peripheral interface unit serves to isolate these lower speed devices and avoids additional bus loading on the higher speed system bus. A typical access time to access a peripheral device may be on the order of 4–10 system bus clocks once an access request has been received by the peripheral interface unit. These accesses degrade system performance due to the long access latency. System performance therefore may be improved by buffering data for the peripheral write accesses. An example of a write buffer in a peripheral controller is discussed in U.S. Pat. No. 5,712,991 by Wichman et al. entitled "Buffer Memory for I/O Writes Programmable Selective". The Wichman et al. controller dedicates a buffer for each peripheral device in a computer system and stores information in each buffer based upon instruction type.

BRIEF DESCRIPTION OF THE DRAWINGS

The present invention is illustrated by way of example and is not limited by the accompanying figures, in which like references indicate similar elements.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

Figure 1:
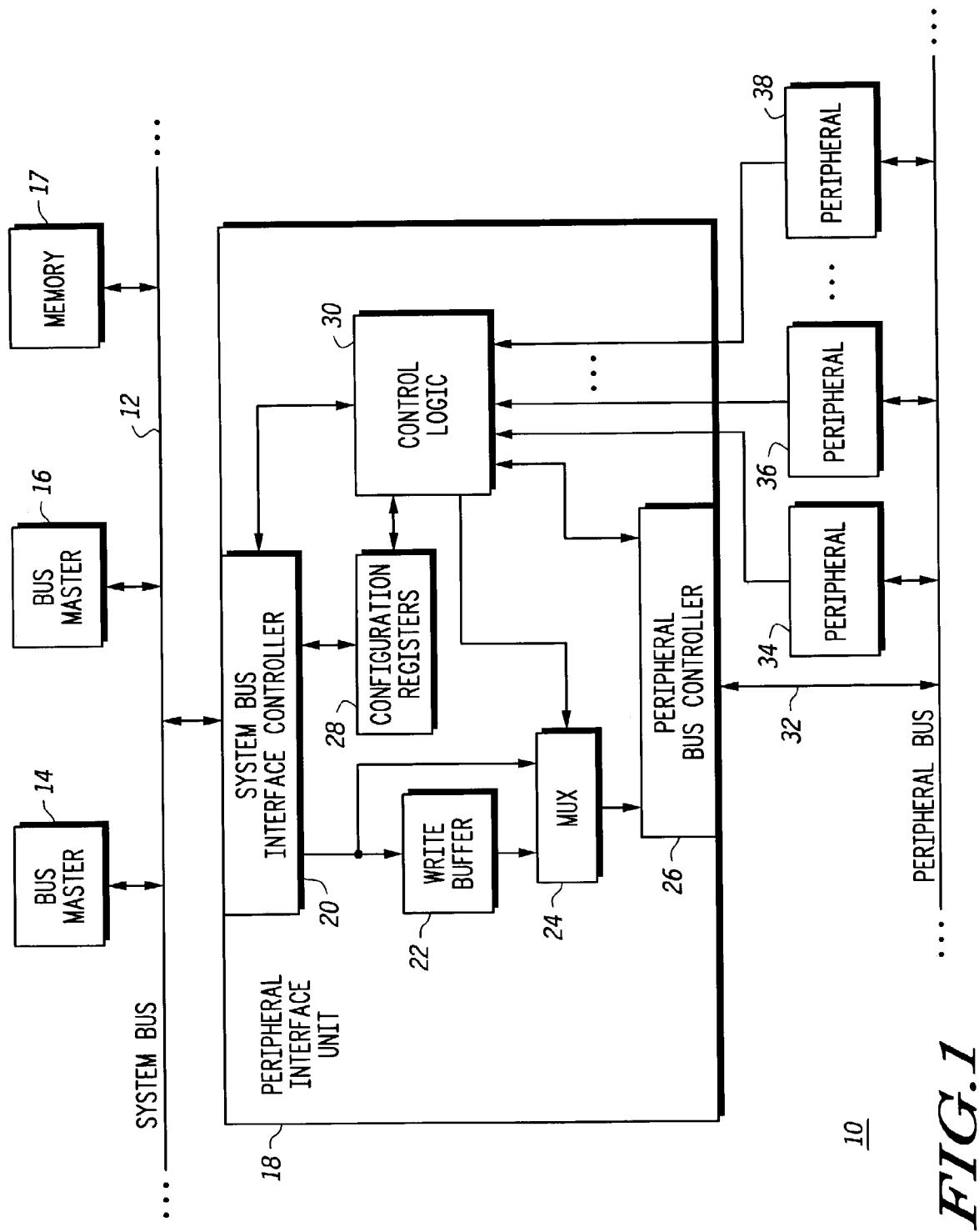
FIG. 1 illustrates in block diagram form a peripheral interface having a shared write buffer in accordance with the present invention.

FIG. 1 illustrates a data processing system 10 in accordance with the present invention. Multiple bus masters, such as a bus master 14 and a bus master 16 are operably connected or coupled to a system bus 12. It should be understood that the multiple bus masters may be connected to system bus by other buses (not shown) or directly. Bus masters 14 and 16 may be implemented as any of a variety of differing types of functional devices, such as a central processing unit (CPU), a direct memory access controller, any type of processor (DSP, graphics, etc.) or any other device that functions as a bus master. Other circuitry is coupled to system bus 12 such as memory 17. A peripheral interface unit 18 is coupled to system bus 12 for interfacing system bus 12 to each of a plurality of peripherals such as peripheral 34, peripheral 36 and peripheral 38 via a peripheral bus 32.

Within peripheral interface unit 18 is a system bus interface controller 20 that has a first input/output that is connected to system bus 12. An output of system bus interface controller 20 is connected to an input of a write buffer 22 and to a first input of a multiplexor (MUX) 24. An output of the write buffer 22 is connected to a second input of multiplexor 24. An output of multiplexor 24 is connected to an input of a peripheral bus controller 26. A plurality of configuration registers 28 has a first input/output connected to a second input/output of system bus interface controller 20. A second input/output of configuration registers 28 is connected to a first input/output of control logic 30. A second input/output of control logic 30 is connected to a third input/output of system bus interface controller 20. A third input/output of control logic 30 is connected to a first input/output of peripheral bus controller 26. An output of control logic 30 is connected to a control input of multiplexor 24. In the illustrated form, each of peripheral 34, peripheral 36 and peripheral 38 has an input/output connected to peripheral bus 32. An output of peripheral 34 is connected to a first input of control logic 30 for providing a bus arbitration/bus master policy override signal or a side band signal since the signal is contained within peripheral interface unit 18. An output of peripheral 36 is connected to a second input of control logic 30 for providing another override signal, and an output of peripheral 38 is connected to a third input of control logic 30 for providing yet another override signal. It should be understood that any number of peripherals may be implemented in data processing system 10 and in modern systems a very large number of peripherals, such as thirty-two or more, exist.

In operation, any one of multiple bus masters, such as bus master 14 and bus master 16, interface with peripheral interface unit 18 to write information or data to a predetermined one of the peripherals, such as peripheral 34, peripheral 36 and peripheral 38. Write buffer 22 is jointly shared among all the bus masters to selectively write data to any one of the peripherals and functions as a single storage buffer. Because each of the peripherals 34, 36 and 38 is typically slower in operational speed than each of the bus masters 14 and 16, write buffer 22 is selectively used to store information to be written to one of the peripherals 34, 36 and 38 so that the system bus 12 may be released for another processing operation prior to completion of the write operation to the chosen peripheral. In one form, system bus 12 is released by the action of peripheral interface unit 18 deasserting a bus control signal (not shown) in accordance with a predetermined conventional bus protocol. Peripheral interface unit 18 therefore serves to isolate the lower speed peripherals from system bus 12 and to avoid additional bus loading on system bus 12 that is a high performance bus. Typical access time to one of peripherals 34, 36 and 38 is on the order of four to ten system bus clocks once an access request has been received at the system bus interface controller 20 of peripheral interface unit 18 which functions as input circuitry to the peripheral interface unit 18. The peripheral accesses therefore degrade system performance due to the long access latency. However, not all peripheral accesses may be buffered because should a subsequent error occur and be detected, the peripheral will not be able to communicate the error to the originating bus master if the system bus 12 has already been released for use by another requesting bus master. Therefore, write buffer 22 control is herein provided including providing selectivity of what data and what peripherals are utilized with write buffer 22.

Additionally, write buffer 22 functions as a single, commonly shared storage device that is used for each of a predetermined number of peripherals rather than to dedicate a write buffer specifically to each peripheral. Because there is a large number of peripherals, the savings in circuit size by using a single write buffer 22 are very significant. Additionally, configuration registers 28 and control logic 30 function to determine when and under what circumstances a write operation to one of the peripherals 34, 36 and 38 occurs. As will be described below, write buffer 22, configuration registers 28 and control logic 30 function to be able to distinguish among multiple bus masters and to selectively buffer write requests on a per-master basis through a programmable set of control bits. Further, the ability to distinguish which peripheral device is being accessed exists and there is selective control over buffering of an individual peripheral's accesses. Each peripheral is capable of determining the access types that are buffered. As will also be described herein, write buffer 22 supports dynamic disabling of write buffering for individual peripherals based on a hardware request input driven by the peripheral. Therefore, a peripheral can dynamically override a static policy programmed into storage locations of configuration registers 28 based on the dynamic state of the peripheral.

The system bus interface controller 20 functions as input circuitry to peripheral interface unit 18 to communicate data to/from the bus masters 14 and 16 and memory 17 to the peripherals 34, 36 and 38. To accomplish this function, system bus interface controller 20 receives from each bus master a signal via a predetermined conductor within system bus 12 that indicates, such as by logic state, whether a data transfer is a supervisor mode data transfer or a user mode data transfer. Additionally, system bus interface controller 20 receives a signal of predetermined bit width that specifically identifies which bus master currently has bus control and is to be acknowledged as the current bus master. Any other data transfer request not have bus mastership status is not acknowledged.

Figure 2:
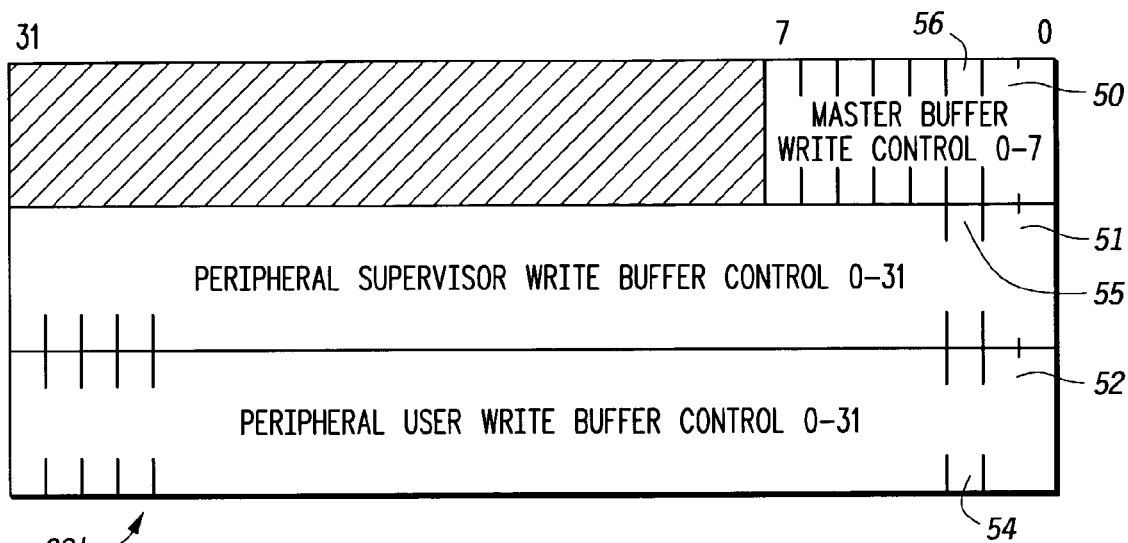
FIG. 2 illustrates in perspective form a portion of the configuration registers of the peripheral interface of FIG. 1.

Configuration registers 28 function as software-alterable control registers having multiple storage locations and are augmented with a state machine-based set of dynamic hardware control inputs to control logic 30 provided by each of peripherals 34, 36 and 38. Illustrated in FIG. 2 is a portion 28' of configuration registers 28. Contained within portion 28' of configuration registers 28 is a field 50 that has eight bits, including a bit 56, which function to control write buffer 22 based upon the bus master originating the write request. For example, bit 56 determines whether the system bus interface controller 20 is enabled to buffer writes from a predetermined one of the plurality of bus masters including bus masters 14 and 16. By way of illustration only, when bit 56 has a logic zero state, write accesses from the predetermined master are not capable of being buffered, and therefore data is routed a bypass path from system bus interface controller 20 to multiplexor 24 and peripheral bus controller 26 to one of peripherals 34, 36 and 38. Peripheral bus controller 26 functions as peripheral interface circuitry to peripheral bus 32. When bit 56 has a logic one state, write accesses from the predetermined master are buffered and data is stored in write buffer 22. Although eight bits representing eight bus masters are illustrated, it should be understood that fewer or more bus master write buffer control bits may be implemented. FIG. 2 illustrates a thirty-two bit frame since that size is one of several common bus width sizes implemented in data processing. The unused portion in FIG. 2 is represented by cross-hatching and is reserved for future expansion in system 10, if needed. Within a frame 51 is a plurality of bits that provide peripheral supervisor write buffer control. The frame is illustrated as thirty-two bits in size, but may be implemented with any number of bits. As an example of the functionality, a bit 55 of frame 51 is used to determine whether the system bus interface controller 20 is enabled to store data to a particular peripheral in write buffer 22. The bit location within frame 51 corresponds to a particular one of the peripherals in data processing system. For example, when bit 55 has a logic zero value, write accesses to a predetermined peripheral corresponding to bit 55 are not buffered in write buffer 22 but rather are written directly to the peripheral. Conversely, when bit 55 has a logic one value, supervisor mode write accesses to the predetermined peripheral are buffered in write buffer 22. Within a frame 52 is a plurality of bits that provide peripheral user mode write buffer control. The frame is illustrated as thirty-two bits in size, but may be implemented with any number of bits. As an example of the functionality, a bit 54 of frame 52 is used to determine whether the system bus interface controller 20 is enabled to store data to a particular peripheral in write buffer 22. The bit location within frame 52 corresponds to a particular one of the peripherals in data processing system. For example, when bit 54 has a logic zero value, write accesses to a predetermined peripheral corresponding to bit 54 are not buffered in write buffer 22 but rather are written directly to the peripheral. Conversely, when bit 54 has a logic one value, user mode write accesses to the predetermined peripheral are buffered in write buffer 22. Control logic 30 implements the control functionality of configuration registers 28. When a write request is issued by a bus master onto system bus 12, the bus master may also specify a mode of operation in a field of the instruction or command. For example, one mode is associated with a privilege attribute such as whether the write is a supervisor mode write or a user mode write. Differences between supervisor mode and user mode include the privilege levels where supervisor mode entails significantly more system privileges or rights than user mode. In the illustrated form of fields 51 and 52, the bus master specifies whether a write is a supervisor write or a user write and the mode is detected by the system bus interface controller 20 and control logic 30. The mode determines whether field 51 or field 52 is used. It should be understood that other modes of operation may be implemented by configuration registers 28.

Each of peripherals 34, 36 and 38 may provide a control signal or side band signal to control logic 30 that will override the policy that is programmed in configuration registers 28. The policy programmed in configuration registers 28 is typically static and not modified once programmed, although such modification may be performed if system events indicate that a different policy would be desirable. For example, user code may be executed by one of the bus masters to implement a modified policy within configuration registers 28. However, by using the control signal that is input to control logic 30, write buffering may be dynamically disabled for individual peripherals based on the hardware request to disable. The control signal may be generated in response to the existence of one or more predetermined states in the peripheral or by other predetermined criteria, such as timing criteria. Therefore, there is provided herein a dynamic override mechanism that enables a peripheral to modify a predefined write buffer policy to a peripheral based on predetermined conditions that are subject to change, such as a state.

Figure 3:
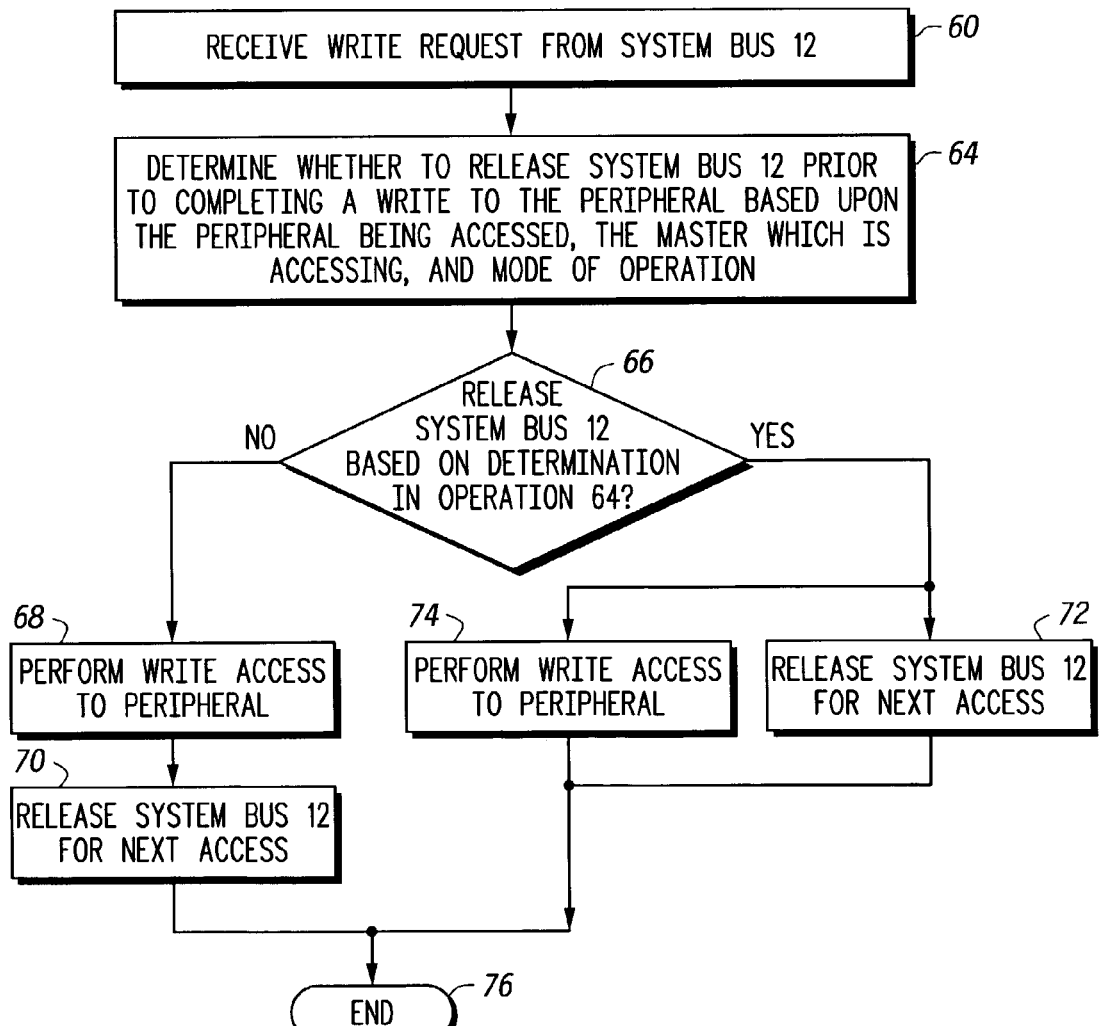
FIG. 3 illustrates in flow chart form a method for controlling a shared write buffer among multiple peripherals in accordance with the present invention.

Illustrated in FIG. 3 is a flow diagram illustrating the control of write buffer 22 in data processing system 10. In an operational step 60, a write request is received from the system bus 12. In an operational step 64, a determination is made whether to release system bus 12 prior to completing a write to the peripheral. In one form, the determination is based upon the peripheral being accessed, the particular master which is accessing the write buffer 22 (i.e. the initiator of the access), and the mode of operation (e.g. user mode or supervisor mode). In other forms, only some of these criteria or other criteria may be used to make the determination. In an operational step 66, a decision is made whether to release system bus 12 based on the determination in operational step 64. If the system bus 12 is released, two operations are performed currently. In an operational step 72 the system bus 12 is released for a next access. In an operational step 74, a write access to a peripheral is performed. When both steps are completed, an end operational step 76 occurs. If the system bus 12 is not released, a write access to a peripheral device is performed in an operational step 68. In a subsequent step 70, the system bus 12 is released for a next access prior to implementing the end operational step 76. In each of steps 68 and 74 the write access to a peripheral may be done either by writing to write buffer 22 or by bypassing write buffer 22 and directly writing to a predetermined peripheral device. However, in step 74, since the system bus 12 is being released concurrently, generally the write access to the peripheral will involve a write to the write buffer 22. By buffering the write access in write buffer 22 and releasing the system bus 12 prior to completion of the write to the targeted peripheral, improved utilization of system bus 12 is obtained, resulting in improved performance of data processing system 10.

By now it should be appreciated that there has been provided a data processing system and method having a flexible control scheme for selecting when a peripheral write should involve a write to a write buffer. By using a single write buffer for a plurality of peripherals, a low-cost buffering solution is provided. Configuration registers 26 and the associated control provide a flexible control mechanism to determine when peripheral writes should be buffered. Fine-grained control may be implemented to implement write buffering policies and the policies may be modified dynamically. The net result is improved real-time performance in embedded memory systems where costs must be minimized.

In the foregoing specification, the invention has been described with reference to specific embodiments. However, one of ordinary skill in the art appreciates that various modifications and changes can be made without departing from the scope of the present invention as set forth in the claims below. For example, the peripheral bus 32 may be implemented by interface circuitry wherein the peripheral bus controller 26 communicates individually and directly with each of the peripherals 34, 36 and 38 rather than sharing a common bus. The specific location and positioning of certain circuitry may vary. For example, the circuitry associated with the functionality of control logic 30 may be spread throughout the peripheral interface unit 18 rather than being more collectively located as impliedly shown in FIG. 1. While the method and circuitry shown herein is described in the context of a write memory access, it should be apparent that other types of peripheral accesses, such as read-modify-write may be implemented. Accordingly, the specification and figures are to be regarded in an illustrative rather than a restrictive sense, and all such modifications are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

What is claimed is:

1. A peripheral interface for interfacing a bus and a plurality of peripherals, comprising:

bus interface circuitry coupled to the bus to receive write accesses from the bus;

peripheral interface circuitry for providing write access to the plurality of peripherals;

a write buffer coupled to the bus interface circuitry and configured to receive write accesses from the bus interface circuitry and to provide write access to each of the plurality of peripherals via the peripheral interface circuitry; and control logic coupled to the bus interface circuitry and the peripheral interface circuitry, the control logic controlling whether to release the bus prior to completing a write access to an addressed one of the plurality of peripherals based at least upon which peripheral is being accessed and based upon a mode of operation of a plurality of modes of a bus master operably coupled to the bus.

2. The peripheral interface of claim 1 wherein the bus is not released prior to completion of a write access to a peripheral at least unless: (1) a storage location of a first plurality of storage locations of one or more configuration registers that is associated with the bus master of the write access indicates that the bus is to he released prior to completion of a write access initiated by the bus master; and (2) a storage location of a second plurality of storage locations of the one or more configuration registers that is associated with the peripheral of the write access indicates that the bus is to be released prior to completion of a write access to the peripheral.

3. A peripheral interface for interfacing a bus and a plurality of peripherals comprising:

bus interface circuitry coupled to the bus to receive write accesses from the bus;

peripheral interface circuitry for providing write access to the plurality of peripherals;

a write buffer coupled to the bus interface circuitry and configured to receive write accesses from the bus interface circuitry and to provide write access to each of the plurality of peripherals via the peripheral interface circuitry;

control logic coupled to the bus interface circuitry and the peripheral interface circuitry, the control logic controlling whether to release the bus prior to completing a write access to an addressed one of the plurality of peripherals based at least upon which peripheral is being accessed; and an input coupled to a receive a control signal from one or more of the plurality of peripherals, wherein a determination of whether to release the bus prior to completion of a write to the one or more of the plurality of peripherals is based upon the control signal.

4. A method for performing a write access to a peripheral of a plurality of peripherals comprising:

receiving a write access to the peripheral of the plurality of peripherals from an initiator via a bus;

determining whether to release the bus prior to completing the write access to the peripheral based at least upon which of the plurality of peripherals is being accessed and based upon which initiator of a plurality of initiators is initiating the write access;

completing the write access to the peripheral;

releasing the bus, wherein the bus is released either prior to completing the write access or after completing the write access based on the determining.

5. The method of claim 4 wherein the determining is further based upon a mode of operation of the initiator of the access.

6. The method of claim 4 wherein the determining is further based upon whether the peripheral being accessed has provided a signal indicating that the bus is not to be released prior to a write to that peripheral.

7. The method of claim 4 wherein the releasing the bus further includes de-asserting a bus control signal of the bus.

8. A peripheral interface comprising:

input circuitry to receive write accesses from a bus;

a peripheral bus controller to provide write access to a plurality of peripherals; and control logic configured to determine whether to release the bus prior to completion of a write access to a peripheral of the plurality of peripherals based at least upon which initiator of a plurality of initiators is initiating the write access.

9. The peripheral interface of claim 8 further comprising:

a first plurality of storage locations coupled to the control logic, with each storage location of the first plurality of storage locations associated with an initiator of the plurality of initiators coupled to the bus, wherein the control logic is configured to determine whether to release the bus prior to completing a write access initiated by an initiator of the plurality of initiators to a peripheral of the plurality of peripherals based at least upon stored contents of a storage location of the first plurality of storage locations associated with the initiator initiating the write access.

10. The peripheral interface of claim 9 wherein the bus is not released prior to completion of the write access at least unless a storage location correlated to the initiator of the write access indicates that the bus is to be released prior to completion of a write access initiated by the initiator.

11. The peripheral interface of claim 9 wherein the control logic is configured to determine whether to release the bus prior to completion of a write access to a peripheral of the plurality of peripherals based at least upon which initiator of the plurality of initiators is initiating the write access and upon determining whether a corresponding storage location of the plurality of storage locations associated with the initiator initiating the access indicates whether the bus is to be released prior to completion of a write access initiated by the initiator.

12. The peripheral interface of claim 9 further comprising:

a second plurality of storage locations, each storage location of the second plurality correlated to a peripheral of the plurality of peripherals, wherein each storage location of the second plurality of storage locations indicates whether to release the bus prior to completing a write access to a peripheral associated with that storage location.

13. The peripheral interface of claim 12 wherein the bus is not released prior to completion of a write access to a peripheral at least unless a storage location of the first plurality of storage locations associated with the initiator of the write access indicates that the bus is to be released prior to completion of a write access initiated by the initiator and a storage location of the second plurality of storage locations associated with the peripheral of the write access indicates that the bus is to be released prior to completion of a write access to the peripheral.

14. A system comprising the peripheral interface of claim 8 and further comprising:

the bus coupled to the input circuitry;

the plurality of initiators operably coupled to the bus; and the plurality of peripherals coupled to the peripheral interface unit.

15. A peripheral interface comprising:

input circuitry to receive write accesses from a bus;

peripheral interface circuitry to provide write access to a plurality of peripherals; and control logic configured to determine whether to release the bus prior to completing a write access to a peripheral of the plurality of peripherals based at least upon a mode of operation of a plurality of modes of a write access initiator.

16. The peripheral interface of claim 15 wherein each mode of operation of the plurality of modes is associated with a privilege attribute of a plurality of privilege attributes.

17. The peripheral interface of claim 16 wherein a first privilege attribute of the plurality of privilege attributes is a user mode, and a second privilege attribute of the plurality of privilege attributes is a supervisor mode.

18. The peripheral interface of claim 15 further comprising:

a first plurality of storage locations, each storage location of the first plurality of storage locations is correlated with a peripheral of the plurality of peripherals, wherein each storage location of the first plurality of storage locations is indicative of whether to release the bus prior to completion of a write access initiated by the write access initiator in a first mode of operation to a peripheral correlated with that storage location; and a second plurality of storage locations, each storage location of the second plurality associated with a peripheral of the plurality of peripherals, wherein each storage location of the second plurality is indicative of whether to release the bus prior to completion of a write access initiated by write access initiator in a second mode of operation to a peripheral correlated with that storage location.

19. A peripheral interface comprising:

input circuitry to receive write accesses from a bus;

peripheral interface circuitry to provide write access to a plurality of peripherals; and control logic coupled to the input circuitry, the control logic configured to determine whether to release the bus prior to completing a write access to a peripheral of the plurality of peripherals, wherein the control logic is responsive to an override control signal from the peripheral of the plurality of peripherals that overrides bus policy by being indicative of whether the bus is released prior to completion of the write access to the peripheral.

20. The peripheral interface of claim 19 further comprising:
   a plurality of storage locations;
   wherein the control logic is configured to determine whether to release the bus prior to completion of the write access to the peripheral based at least upon stored contents of a storage location of a plurality of storage locations, wherein an indication by a signal from the peripheral device indicating that the bus is not to be released prior to completion of the write access to the peripheral device overrides a determination based at least upon the stored contents of the storage location of the plurality of storage locations.

21. The peripheral interface of claim 19 wherein the plurality of peripherals is coupled to the peripheral interface circuitry via a peripheral bus and wherein the signal from the peripheral is a side band signal.

* * * * *